Figure 1:
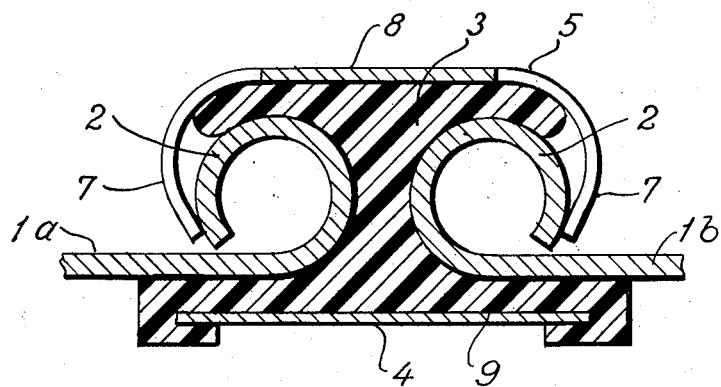

United States Patent
Moldow

[11] 3,791,681
[45] Feb. 12, 1974

[54] DEVICES FOR ESTABLISHING SEALING CONNECTION BETWEEN THE ENDS OF TUBULAR MEMBERS OF SHEET METAL

[76] Inventor: Preben Moldow, Moelledamsvej 10, Birkeroed, Denmark

[22] Filed: Feb. 15, 1972

[21] Appl. No.: 226,620

[30] Foreign Application Priority Data
Feb. 17, 1971 Denmark............................... 711/71
Jan. 17, 1972 Denmark............................... 75/72

[52] U.S. Cl.................. 285/233, 285/364, 285/371, 285/424
[51] Int. Cl............................................. F16l 21/00
[58] Field of Search ... 285/236, 364, 371, 398, 424, 285/233, 365, 366, 367; 24/23, 25, 81 CC, 207

[56] References Cited
UNITED STATES PATENTS

| | | | |
|---|---|---|---|
| 3,503,632 | 3/1970 | Braun | 285/371 X |
| 3,630,549 | 12/1971 | Grimm | 285/364 |
| 3,669,474 | 6/1972 | Bode | 11/365 |
| 3,473,829 | 10/1969 | Daniels | 285/398 X |
| 2,219,161 | 10/1940 | Jacobs | 285/365 |
| 2,766,998 | 10/1956 | Wotts et al. | 285/365 X |
| 184,599 | 11/1876 | Ehrhordt | 285/364 X |
| 3,686,747 | 8/1972 | Bagnulo | 285/371 |

FOREIGN PATENTS OR APPLICATIONS

| | | | |
|---|---|---|---|
| 243,931 | 5/1960 | Australia | 285/424 |
| 580,775 | 7/1933 | Germany | 285/371 |
| 1,009,141 | 5/1957 | Germany | 285/365 |
| 1,027,020 | 3/1958 | Germany | 285/364 |

Primary Examiner—Dave W. Arola
Attorney, Agent, or Firm—Steinberg & Blake

[57] ABSTRACT

A device for establishing sealing connection between the ends of tubular members, comprising outwardly bent end portions on the tubular members af resilient connecting strip having a substantially U-shaped cross section and forced over the outwardly bent end portions of the tubular members to clamp the latter against a sealing member arranged therebetween, the cross section of the sealing member being composed of a first portion adapted to be clamped between the outwardly bent end portions of the tubular members, a second portion constituting a flange extending into the adjoining tubular members to align the same, and a web connecting the first and second portion.

4 Claims, 5 Drawing Figures

PATENTED FEB 12 1974 3,791,681

SHEET 2 OF 2

DEVICES FOR ESTABLISHING SEALING CONNECTION BETWEEN THE ENDS OF TUBULAR MEMBERS OF SHEET METAL

This invention relates to devices for establishing sealing connection between the ends of tubular members of sheet metal or like material, such as elements for ventilation channels. More particularly, the invention is concerned with connecting devices of the type in which the tubular members are provided with outwardly bent end portions between which a sealing member of resilient material is arranged and which are clamped between the legs of a connecting strip having a substantially U-shaped cross section and engaging the outwardly bent end portions of the tubular members in such a manner as to be held in place, the clamping strip comprising a substantially flat web portion and a plurality of individually flexible lateral fingers constituting the legs of the U-section of the connecting strip and separated from each other by recesses extending to the web of the connecting strip.

A major problem with such connecting devices is to properly align the tubular members with each other before clamping them together by means of the clamping strip. This is especially true if the tubular members are of non-polygonal, e.g., circular cross section, because in this instance the clamping strip has to be applied in one length extending continuously around the tubular members. If the connecting strip is applied to insufficiently aligned tubular members, its fingers will not properly engage the end portions of the tubular members, and the sealing of the joint will be defective.

It has been proposed to insure proper alignment of the tubular members by means of a separate alignment frame inserted into the tubular members and engaging both members to be connected. This alignment frame subsequently remains in the channel and thus constitutes an additional cost.

It is the primary object of this invention to avoid these drawbacks.

Thus, it is an object of the invention to provide a connecting device which will enable the tubular members to be sealingly connected in an easy manner, while insuring a perfect alignment of the tubular members.

Another object is to provide a connecting device with which proper alignment of the tubular members is insured without the use of additional aligning means.

A further object is to provide a connecting device in which alignment of the tubular members is insured by an appropriate form of the sealing member placed between the adjoining ends of the tubular members.

Still another object is to provide a connecting device of the kind referred to which is inexpensive in manufacture and easy to use.

Figure 2:
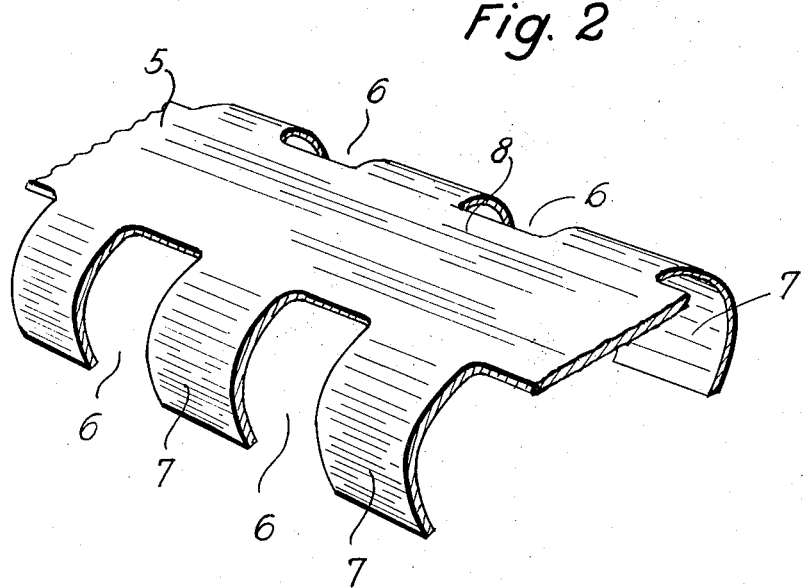
Figure 3:
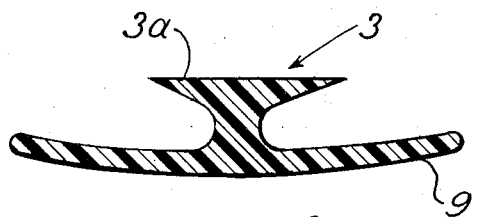
Figure 4:
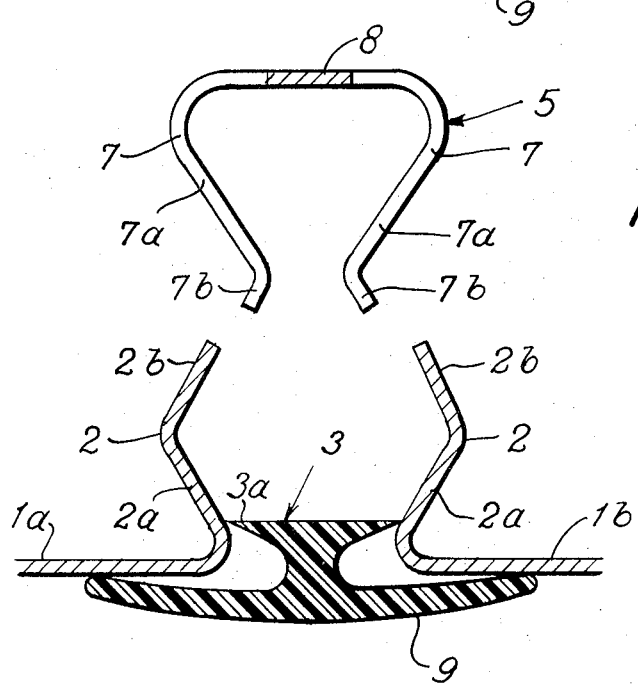
Figure 5:
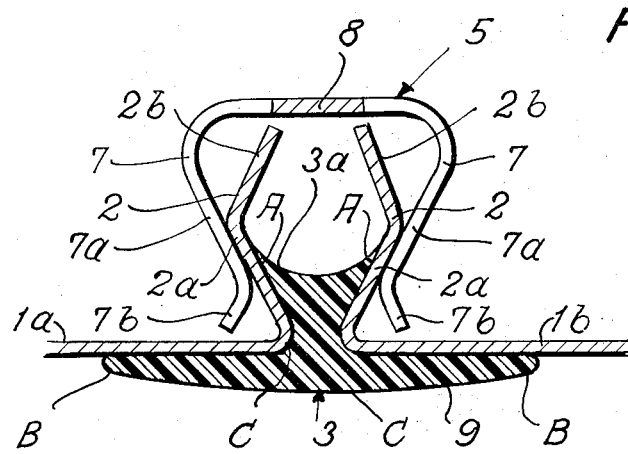

The invention will now be described in greater detail hereinafter, reference being had to the accompanying drawing, in which:

FIG. 1 is a cross-sectional view of a joint of a pair of tubular members with one form of the connecting device of this invention, FIG. 2 is a perspective view of a connecting strip for use in the device of FIG. 1, FIG. 3 is a cross-sectional view of sealing member for another form of connecting device in accordance with this invention, FIG. 4 is a cross-sectional view of the joint before mounting of the connecting strip, and FIG. 5 the same after mounting of the connecting strip.

In FIG. 1, reference numerals 1a and 1b denote adjoining ends of a pair of tubular, e.g., cylindrical, conduit elements of sheet metal. The marginal portions of the sheet metal constituting these elements is bent or rolled outwards so as to form marginal beads 2 having a substantially circular cross section. These beads engage opposed lateral grooves in a sealing strip or gasket 3 having a substantially H-shaped cross section. Thus, the sealing strip 3 engages both the outer circumferential face and the inner circumferential face of the beads, so as to insure proper alignment of the elements 1a and 1b as soon as the beads 2 are introduced into the grooves of the sealing strip 3. In order to further stabilize this alignment, the portion 9 engaging the inner circumferential wall of the elements is in the form of a flange extending a certain additional distance into the conduit elements. This flange 9 is reinforced by means of a spring steel ribbon 4 which imparts a certain rigidity thereto.

When the conduit elements 1a and 1b have been provisionally aligned in this manner, a connecting strip 5 made of ribbon steel and having a substantially U-shaped cross section is applied, as illustrated in FIG. 1. More specifically, the section of the connecting strip 5 is such that the intermediate portion or web 8 of the section engages the outer circumferential face of the portion of the sealing strip 3 extending outside the beads 2, so as to urge this portion against the beads, while the legs 7 of the U-section of the connecting strip 5 snap behind the beads 2. The steel ribbon constituting the connecting strip 5 is provided with lateral, rectangular recesses 6 which are equally spaced and between which fingers are formed which constitute the legs 7 of the U-section of the connecting strip. The web 8 between opposed recesses 6 being flat, the connecting strip 5 has great lengthwise flexibility so as to be well adaptable to various diameters and cross sections of the conduit elements 1a and 1b.

The cross section of the connecting strip 5 is such, relative to the dimensions of the beads 2 and the sealing strip 3, that before application of the connecting strip to the joint the distance between the free ends of opposed fingers 7 is somewhat smaller than the distance between remote faces of the beads 2, when introduced into the lateral grooves of the sealing strip 3. When the connecting strip is applied, the fingers 7 will thus be resiliently forced away from each other so as to urge the beads 2 against each other with corresponding force. The circular cross section of the beads 2 is helpful for this dilation of the cross section of the connecting strip 5 and enables the fingers 7 to resiliently approach each other again to the position illustrated in FIG. 1 after a certain maximum dilation, thereby at the same time urging the web 8 into engagement with the circumference of the sealing strip 3.

In the example illustrated in FIGS. 3 to 5, in which like parts are denoted by like reference numerals, the sealing strip 3 which may be made of PVC, for example, has likewise a substantially H-shaped cross section, however with the difference that the flanges of this section have unequal widths. More specifically, the upper flange 3a in FIG. 3 has a much smaller width than the lower flange 9. The outer (upper) face of the flange 3a is substantially flat, and the section of this flange is tapered wedge-like to both sides, while the flange 9 has a substantially uniform thickness and is slightly arcuate in the transverse direction with its convex face remote from the flange 3a, i.e., facing the axis of the conduit elements (FIGS. 3 and 4).

The adjoining ends of the conduit elements 1a and 1b are formed with outwardly bent flanges 2 having a substantially S-shaped cross section. The portions 2a of the flanges 2 adjacent the wall of the conduit extend under an acute angle with the conduit axis which is greater than the corresponding "wedge" angle of the flange 3a of the sealing strip 3 (FIG. 4). The outer portions 2b of the flanges 2 are inclined in the opposite direction under approximately the same angle with the conduit axis.

The connecting strip 5 is basically formed in the same manner as that illustrated in FIGS. 1 and 2. However, the fingers 7 converge on part of their lengths, under an angle which is somewhat greater than the angle between the flange portions 2a of adjoining ends of the elements 1a and 1b, while the ends 7b of the fingers 7 diverge under an angle which is somewhat smaller than the angle between the flange portions 2b of adjoining ends of the elements 1a and 1b. The whole is designed in such a manner that, when the connecting strip 5 has been applied to the joint (FIG. 5), the fingers will have been forced so much from each other as to lie substantially flatly against the rear faces of the flange portions 2a.

When the connecting strip 5 is caused to engage the flanges 2, the latter are forced towards each other, squeezing the flange 3a of the sealing strip 3 between them so as to force the edges of the flange 3a radially outwards, i.e., away from the wall of the conduit, as illustrated in FIG. 5. The consequence is that the whole of the sealing strip 3 is forced outwards so that the arcuate flange 9 is urged resiliently against the inner faces of the conduit elements 1a and 1b, its arcuate section being thereby straightened. Thus, an effective sealing pressure is obtained at the points denoted by A and B in FIG. 5. Furthermore, the ends of the conduit elements 1a and 1b are firmly pressed against the web of the H-section of the sealing strip 3, at the points C, whereby also a good mechanical stability of the joint is obtained.

I claim:

1. A device for establishing a sealed connection between the ends of tubular members, two tubular members having outwardly bent end portions respectively provided with outer surfaces which are directed away from each other and having surfaces inclined inwardly toward each other and toward the walls of said tubular members with said inwardly inclined surfaces of said outwardly bent end portions being situated closer to each other than parts of said outwardly bent end portions which are at a maximum distance from each other, the latter parts being situated at a greater distance from the walls of said tubular member than said inwardly inclined surfaces of said outwardly bent end portions, comprising a sealing member clamped between said end portions and having a cross section including a first portion situated between said end portions and having a maximum width greater than the minimum distance between the joined ends of said tubular members, a second portion in the form of a flange extending into adjoining tubular members and engaging the inner faces thereof, and a web connecting said first and second portions, and a connecting strip having a substantially U-shaped cross section with a substantially flat web and legs constituted by spaced, springy fingers distributed longitudinally along each side of said flat web and extending around and inwardly beyond said parts of said outwardly bent end portions which are at a maximum distance from each other while resiliently engaging and pressing against said inwardly inclined surfaces of said outwardly bent end portions to clamp said sealing member between said tubular members, said first portion of said sealing member being in the form of a flange which, in the unclamped condition of said sealing member, has a substantially flat outer face and a cross section tapering wedge-like to both sides, and the cross section of said outwardly bent end portions of said tubular members being, at places engaging said flange, inclined under such an angle with the axis of said tubular members that said end portions deflect and situate the lateral edges of said flange radially outwards.

2. A device as in claim 1, wherein the cross section of said outwardly bent end portions is substantially S-shaped.

3. The combination of claim 2 and wherein said outwardly bent substantially S-shaped end portions respectively have first legs forming an acute angle with the walls of said tubular members and having said inwardly inclined surfaces engaged by said fingers and second legs extending from and inclined oppositely to said first legs and forming an obtuse angle with said walls of said tubular members, the intersections between said legs forming the parts of said outwardly bent end portions which are at the maximum distance from each other.

4. A device for establishing a sealed connection between the ends of tubular members, two tubular members having outwardly bent end portions respectively provided with outer surfaces which are directed away from each other and having surfaces inclined inwardly toward each other and toward the walls of said tubular members with said inwardly inclined surfaces of said outwardly bent end portions being situated closer to each other than parts of said outwardly bent end portions which are at a maximum distance from each other, the latter parts being situated at a greater distance from the walls of said tubular member than said inwardly inclined surfaces of said outwardly bent end portions, comprising a sealing member clamped between said end portions and having a cross section including a first portion situated between said end portions and having a maximum width greater than the minimum distance between the joined ends of said tubular members, a second portion in the form of a flange extending into adjoining tubular members and engaging the inner faces thereof, and a web connecting said first and second portions, and a connecting strip having a substantially U-shaped cross section with a substantially flat web and legs constituted by spaced, springy fingers distributed longitudinally along each side of said flat web and extending around and inwardly beyond said parts of said outwardly bent end portions which are at a maximum distance from each other while resiliently engaging and pressing against said inwardly inclined surfaces of said outwardly bent end portions to clamp said sealing member between said tubular members, the cross section of said flange extending into said tubular members being, in the unclamped condition of said sealing member, arcuate with its convexity away from said first portion of said sealing member.

* * * * *